United States Patent [19]

Kato

[11] Patent Number: 4,868,473
[45] Date of Patent: Sep. 19, 1989

[54] INDUSTRIAL ROBOT DEVICE INCLUDING A ROBOT AND A PROCESSING MACHINE

[75] Inventor: Hisao Kato, Aichi, Japan

[73] Assignee: Mitsubishi Denki Kabushiki Kaisha, Tokyo, Japan

[21] Appl. No.: 256,834

[22] Filed: Oct. 12, 1988

Related U.S. Application Data

[62] Division of Ser. No. 160,041, Feb. 24, 1988.

[30] Foreign Application Priority Data

Feb. 24, 1987 [JP] Japan .................................. 62-39126
Mar. 11, 1987 [JP] Japan .................................. 62-55674

[51] Int. Cl.⁴ ............................................. G06F 15/46
[52] U.S. Cl. ............................... 318/568.23; 318/567; 318/573; 364/513; 901/46; 901/9; 901/42
[58] Field of Search ........ 318/568, 640, 687, 565–573; 901/14–16, 9, 20, 21, 23, 24, 26, 29, 30–39, 48; 364/513

[56] References Cited

U.S. PATENT DOCUMENTS

| | | | |
|---|---|---|---|
| 4,338,672 | 7/1982 | Perzley et al. | 364/513 |
| 4,385,358 | 5/1983 | Ito et al. | 364/513 |
| 4,396,945 | 8/1983 | DiMatteo | 901/9 X |
| 4,575,802 | 3/1986 | Walsh et al. | 364/513 |
| 4,590,578 | 5/1986 | Barto et al. | 364/513 |
| 4,606,696 | 8/1986 | Slocum | 901/46 X |
| 4,611,292 | 9/1986 | Ninomiya et al. | 364/513 X |
| 4,675,502 | 6/1987 | Haefner et al. | 901/42 X |
| 4,685,054 | 8/1987 | Manninen et al. | 364/513 X |
| 4,743,819 | 5/1988 | Hashizume | 364/513 X |
| 4,771,222 | 9/1988 | Nakashima et al. | 318/568 X |

*Primary Examiner*—William M. Shoop, Jr.
*Assistant Examiner*—Paul Ip
*Attorney, Agent, or Firm*—Sughrue, Mion, Zinn, Macpeak & Seas

[57] ABSTRACT

An industrial robot device in which deviation between an offline-teaching instruction and an actual movement of a robot according to the instruction can be eliminated. The elimination of deviation is accomplished by adjusting absolute X, Y and Z axes of software for driving the robot with respect to those of a processing machine which operates together with the robot.

4 Claims, 5 Drawing Sheets

INDUSTRIAL ROBOT DEVICE INCLUDING A ROBOT AND A PROCESSING MACHINE

BACKGROUND OF THE INVENTION

The present invention relates to an industrial robot device including a robot and a processing machine. such as a lathe, a welding machine or the like. More particularly. the invention relates to an industrial robot device capable of making the coordinates of the actual movement of the robot or the absolute coordinates of the software programmed for the driving of the robot coincide with the absolute coordinates of the processing device, so that the robot can be accurately operated with respect to the reference planes of the processing machine, in accordance with processing instructions input by an offline-teaching method such as MDI (Manual Data Input). The MDI operations involve the entering of values for the directions of the X, Y and Z axes with respect to the robot and the X. Y and Z dimensions, and moving the robot to the required positions.

FIG. 1 is a diagram illustrating the relation between the coordinates of two points with respect to the X, Y and Z reference planes of the processing machine (such as a lathe or a welding machine) and the coordinates of the locus of the tip of the arm of the robot which is actuated by offline-teaching of the coordinates of these two points. At 21 is a segment joining the coordinates $(X_a, Y_a, Z_a)$ and coordinates $(X_b, Y_b, Z_b)$ of the points a and b taken with respect to the X. Y and Z reference planes of the processing machine at the work station. At 22 is the robot arm tip locus which results from actuation in accordance with a processing instruction. taken in relation to the coordinates of the two points and b, and which joins the coordinates A $(X_A, Y_A, Z_A)$ and B $(X_B, Y_B, Z_B)$. The "deviation" between the coordinates a and A. and b and B may occur due to errors in manufacturing the robot. More specifically, a manufacturing error in the arm length of the robot and/or an error in alignment between the robot and the processing machine may result in such a "deviation".

Assuming that the "deviation" between the two sets of coordinates a and b of the two points and those A and B occurs, if direct teaching relative to the processing machine is not effected but rather the processing instructions are input by the above-mentioned MDI operation, the robot arm tip which is driven via the control unit, etc. on the basis of this processing instruction, moves according to the coordinates of the processing machine, which deviate from the absolute coordinates. It is therefore not possible to carry out processing that is faithful to the processing instructions, input by an offline-teaching procedure such as the above-noted MDI operation.

Further, in the conventional robot, the programmed software's absolute X, Y and Z axes are set in specific directions with respect to the robot. In an industrial robot device including such a conventional robot, the MDI operation is effective if the robot body is installed with the programmed software's absolute X, Y and Z axes accurately matching the X, Y and Z axes of the processing machine such as the lathe or similar processing machine, (See for example, Published Examined Japanese Patent Application No. 55-21362).

In this case, however, since the directions of the programmed software s absolute X, Y and Z axes are generally not indicated on the robot body, in order to actuate the robot via the MDI operation, reference surfaces which are accurately adjusted to the programmed software's absolute X, Y and Z axes are required to be installed at the base of the robot. However, it is likely that due to errors in manufacturing the robot, it will not be easy to adjust the reference surfaces accurately relative to the programmed software's absolute X, Y and Z axes.

SUMMARY OF THE INVENTION

The present invention is intended to alleviate the above problems and has a primary object of providing an industrial robot device by which a robot which has a coordinate "deviation" with respect to the work station's processing machine reference plane can be corrected, and in which the robot can be operated free of the "deviation" even if actuation is effected on the basis of offline-teaching instructions.

Another object of the present invention is to provide an industrial robot device which permits the absolute X, Y and Z axes of the robot software to be easily but accurately adjusted with respect to reference surfaces provided on the robot's base and which permits the MDI operations to be performed effectively.

BRIEF DESCRIPTION OF THE DRAWINGS

In the accompanying drawings.

DESCRIPTION OF THE PREFERRED EMBODIMENTS

Figure 2:
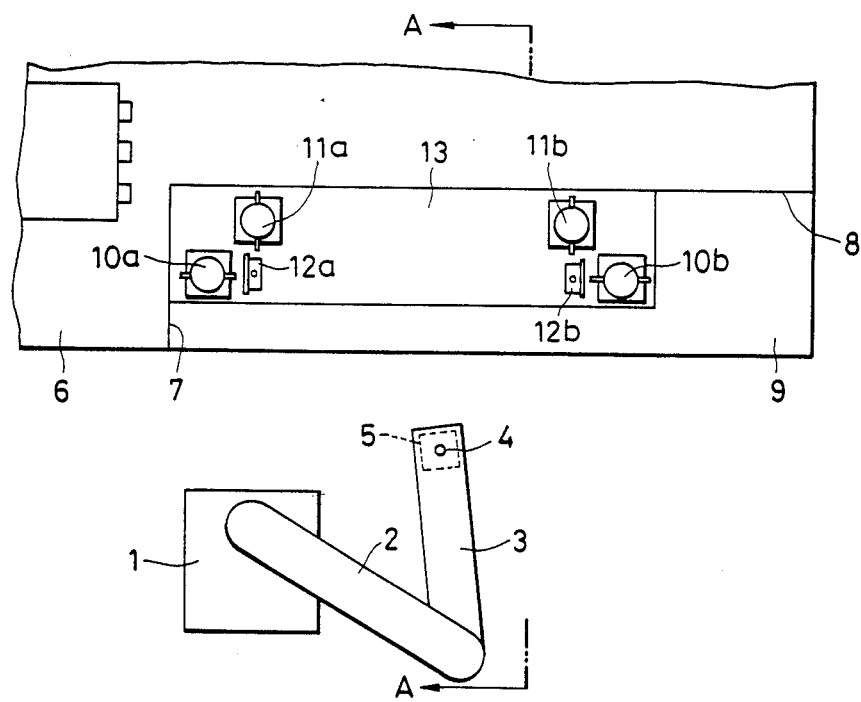
FIG. 2 is a plane view showing the overall configuration of an industrial robot device according to one embodiment of the invention.
Figure 3:
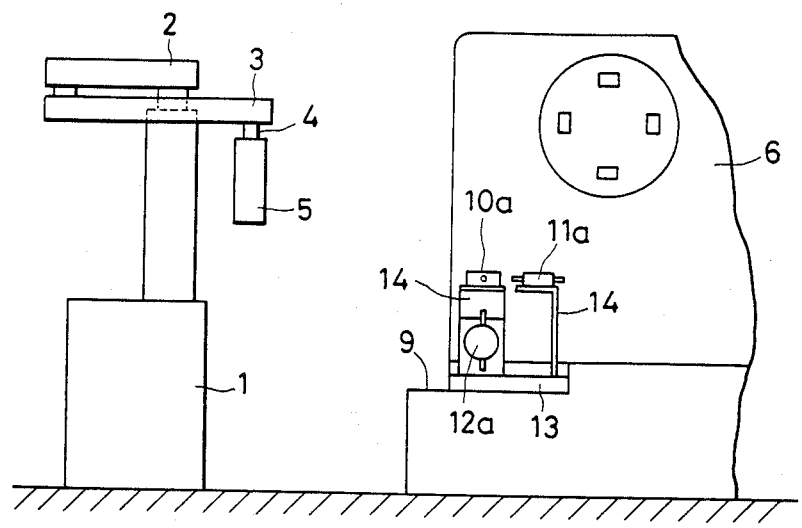
FIG. 3 is a partial sectional view taken along line A—A in FIG. 2.

FIG. 2 is a plane view showing the overall configuration of an industrial robot device according to one embodiment of the present invention and FIG. 3 is a partial sectional view taken along line A—A of FIG. 2.

In the figures, 1 is a robot main body 2 and 3 are movable arms, 4 is a rotatable shaft at the tip-end portion of the movable arm 3, 5 is a prism-shaped contactor which is rotatably mounted on the shaft 4, 6 is a processing machine, e.g., a lathe, etc., where robot work is performed, 7 is an X direction reference plane of the processing machine 6 and similarly 8 and 9 are respectively a Y direction reference plane and a Z direction reference plane thereof, 10a and 10b are X direction measuring elements that are fixed in symmetrical positions on the left and right of the processing machine 6, 11a and 11b are Y direction measuring elements, 12a and 12b are Z direction measuring elements and 13 is a measuring element base to which the X, Y and Z direction measuring elements 10a–12b are fixed by brackets 14 and whose edge and bottom surfaces are brought into contact with the X, Y and Z direction reference planes 7, 8 and 9.

Figure 4:
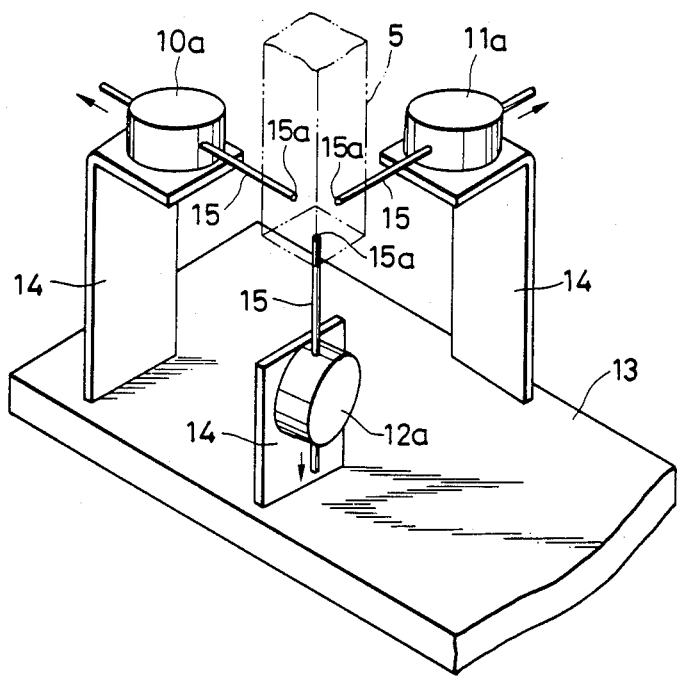
FIG. 4 is a perspective view showing details of measuring elements shown in FIGS. 2 and 3 and peripheral elements.

FIG. 4 is a perspective view which shows in detail the left-hand half of the measuring element base 13 of FIG. 2. The measuring elements 10a, 11a and 12a are fixed to measuring element base 13 via the brackets 14. Measuring bars 15 are mounted in such a manner that contact tips 15a are normally stationary in positions where they project slightly from a reference measurement point (0 position). The bars are free to slide in the directions indicated by arrows in response to contact by the contactor 5, indicated by chain lines in FIG. 4. The measuring means may be a commercially available device such as an electrical dial gauge. The arrangement is such that coordinate data determined through sliding movement of the measuring bars 15 and provided by the measuring elements 10a, 11a and 12a is input to a robot control section by connection lines (not shown). The measuring elements 10b, 11b and 12b which are not shown in FIG. 4 are disposed in left and right symmetry with measuring elements 10a, 11a and 12a and have exactly the same functions.

Figure 5:
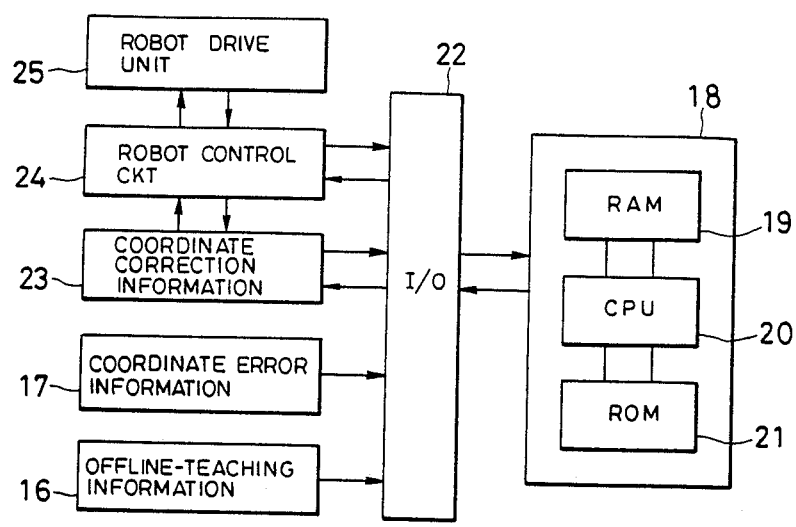
FIG. 5 is a block diagram showing details of a control section of the present invention.

FIG. 5 is a block diagram showing the configuration of the robot control section of an industrial robot device according to the present invention. 16 denotes a source of offline-teaching instructions, 17 denotes X, Y and Z coordinate error information from the various measuring elements 10a–12b, 18 is a computer including a RAM (Random Access Memory) 19, a CPU (Central Processing Unit) 20 and a ROM (Read-Only Memory) 21, 23 denotes coordinate correction information which is obtained from the computer 18 via an I/O (Input-/Output) port 22 in response to the input of X, Y and Z coordinate error information 17, 24 is a robot control circuit and 25 is a robot drive unit.

Figure 1:
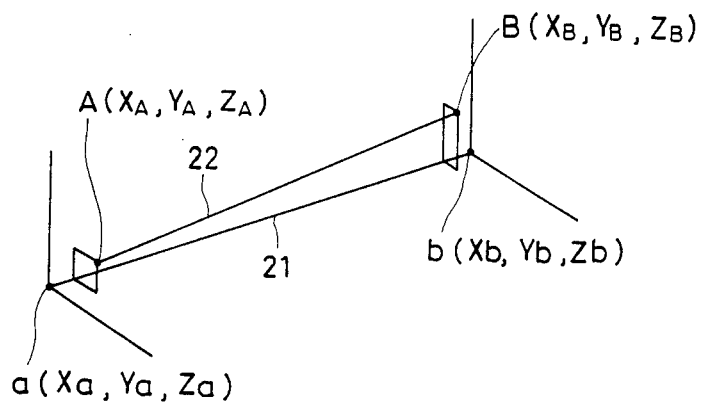
FIG. 1 is a diagram illustrating a robot coordinate error that occurs because of an error in the alignment of the robot mounting, etc.
Figure 6:
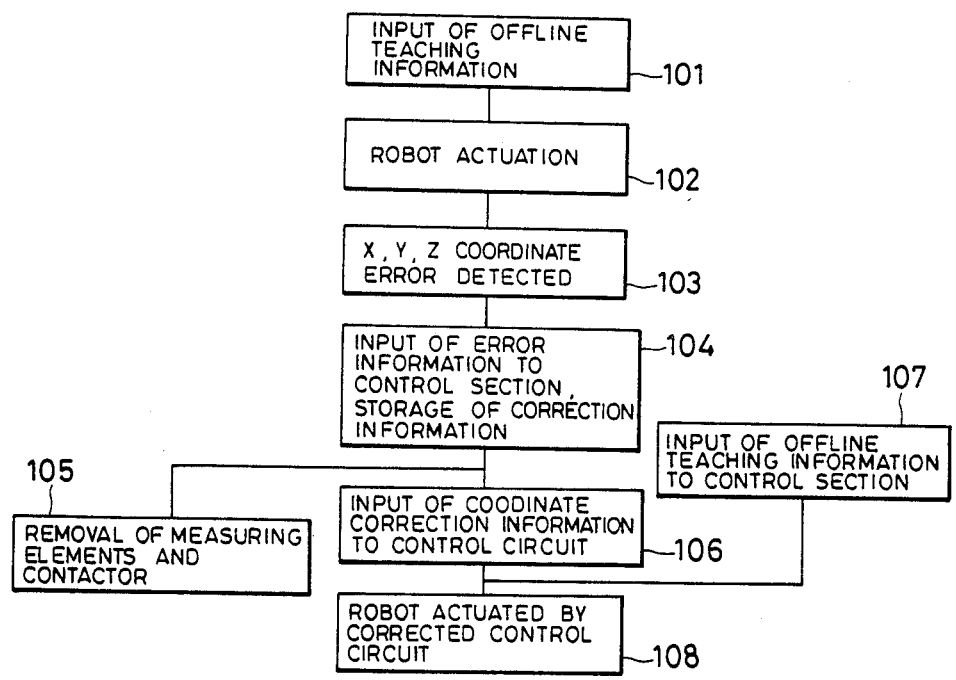
FIG. 6 is a flowchart for description of the operation of the industrial robot device according to the present invention.

The operation of the invention will now be described with reference to FIGS. 2 to 6. FIG. 6 is a flowchart of the operation of the industrial robot device according to the present invention. First, as shown in FIG. 6. the offline-teaching information 16 is input to the I/O port 22 (step 101) and the robot drive unit 25 is actuated via the I/O port 22 by the computer 18 and robot control circuit 24, actuating the robot arms 2 and 3 shown in FIG. 2 (step 102). Contact between the contactor 5 rotatably mounted on the tip end portion of the movable arm 3 and the measuring elements 11a–12b consequent to the above action results in detection of a difference between the coordinates as instructed by offline-teaching and the coordinates of the locus of the tip end of the robot arm 3 as actually actuated. This difference is equivalent to the "deviation" shown in FIG. 1 between the coordinates a ($X_a$, $Y_a$, $Z_a$) and b ($X_b$, $Y_b$, $Z_b$) representing the segment 21 and the coordinates A ($X_A$, $Y_A$, $Z_A$) and B ($X_B$, $Y_B$, $Z_B$) representing the locus of the tip end of robot arm 3 (step 103). The X, Y and Z coordinate error information 17 obtained through this detection is input to the I/O port 22 (step 104).

Next, the measuring element base 13 contacting the X, Y and Z direction reference planes 7, 8 and 9 of the processing machine 6 and the contactor 5 rotatably mounted on the shaft 4 as shown in FIGS. 2 and 3 are removed (step 105). The coordinate correction information 23 that has been calculated, on the basis of the X, Y and Z coordinate error information 17 input to I/O port 22 in step 104 in order to make the coordinates A and B coincide with those a and b, is input to the robot control circuit (step 106).

When all the above steps have been completed, the offline-teaching instructions 16 are input to the I/O port 22 (step 107) and then the instructions 16 are corrected with reference to the coordinate correction information 23 by the robot control circuit 24 and used to drive the robot (step 108). As a result, the "deviation" can be removed so that accurate driving of the robot is accomplished.

In the above-described embodiment, coordinate error information for two points is obtained by the contactor 5 and a pair of X, Y and Z direction measuring elements 10a–12b. However, modifications of this arrangement are possible, For example, in order to improve the accuracy of the movement of the robot, the number of measuring elements for detecting coordinate errors may be increased. Further, although the above-described embodiment is of the horizontal joint type, the same advantages may be achieved by practice of the invention in other types of robots such as vertical joint type robots, cylindrical coordinate type robots, orthogonal type robots or polar coordinate type robots, etc.

Moreover, the coordinate error may be detected by an optical detector and further, the robot software's absolute axes may be precisely adjusted to the reference planes of the processing machine in order to eliminate the occurrence of "deviations". Such modification will be described with reference to FIGS. 7 to 11.

Figure 7:
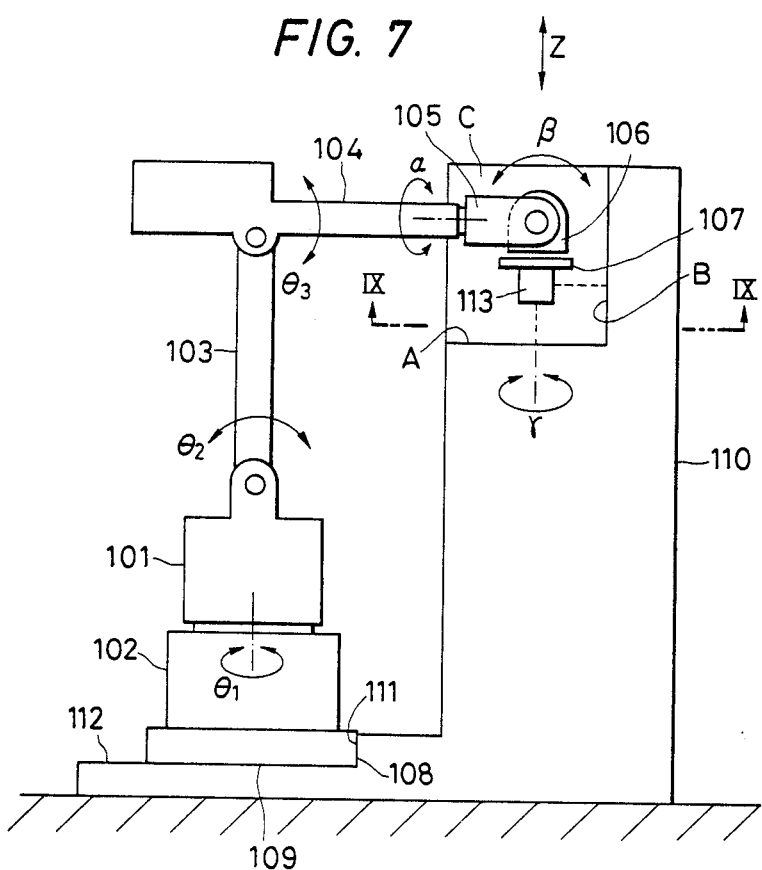
FIG. 7 is a diagram showing another embodiment of an industrial robot device, according to the present invention.
Figure 8:
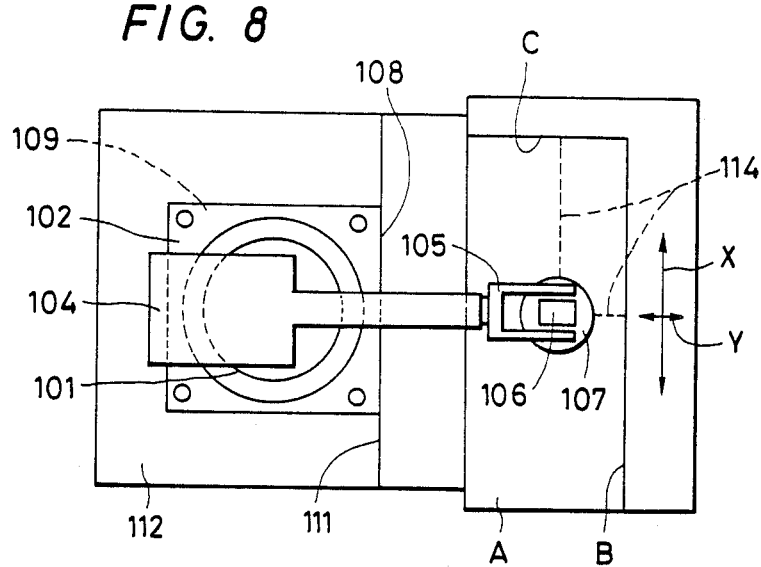
FIG. 8 is a plane view of the second embodiment shown in FIG. 7.
Figure 9:
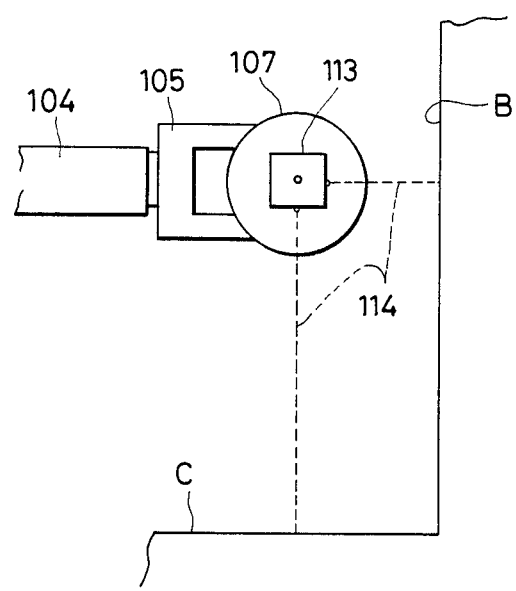
FIG. 9 is an enlarged cross-sectional view taken along line XI—XI of FIG. 7.

FIGS. 7 to 9 show a second embodiment of the present invention. In this embodiment, the above objects of the invention are accomplished by adjusting the absolute coordinates of the software programmed for the robot device to eliminate the occurrence of "deviation". In the figures, 101 is a robot body mounted on a base 102 in such a manner that the body 1 is allowed to rotate in the direction indicated by an arrow $\theta_1$. 103 is a first arm which is mounted on the robot body 101 in such a manner that the first arm 103 is allowed to swing in a direction $\theta_2$, 104 is a second arm which is mounted at the upper end of the first arm 103 in such a manner that the second arm 104 is allowed to swing in a direction $\theta_3$, 105 is a tip-end arm which is mounted on the tip end of the second arm 104 in such a manner that the tip-end arm is allowed to rotate in a direction $\alpha$, 106 is a tip-end member which is mounted on the tip-end arm 105 in such a manner that the tip-end member 106 is allowed to swing in a direction B and 107 is a flange which is mounted at the lower end of the tip-end member 106 in such a manner that the flange 107 is allowed to rotate in a direction $\gamma$. 108 is a first reference surface which is formed on the base 102. The first reference surface 108 is substantially parallel to the absolute X axis and substantially perpendicular to the absolute Y axis of the robot's software. 109 is a second reference surface which is formed on the base 102 and is substantially perpendicular to the absolute Z axis of the robot's software and precisely at right angles to the first reference surface 108. 110 is a measuring device which is sued for the purpose of making adjustments to match the absolute axes X, Y and Z of the robot software to the two reference surfaces 108 and 109. 111 and 112 are robot installation reference surfaces formed on the measuring device 110, with which the first and second reference surfaces 108 and 109 are brought into close contact, respectively. A, B and C are light receiving surfaces which are formed in the upper-end portion of the measurement device 110 in such a manner that they are mutually orthogonal, light receiving surface A being installed so as to be at right-angles to the robot installation reference surface 111 and parallel to the robot installation reference surface 112, the light receiving surface B being installed so as to be parallel to the robot installation reference surface 111 and at right-angles to the robot installation reference surface 112 and the light receiving surface C being installed so as to be at right-angles to both the robot installation reference surfaces 111 and 112. A large number of light receiving elements (not shown) are provided in a matrix array on each of the light receiving surfaces A, B and C. 113 designates a light projector which is mounted at the lower surface of the robot's flange 107 so as to simultaneously radiate light beams such as laser beams 114 onto the respective light receiving surfaces perpendicularly.

Figure 10:
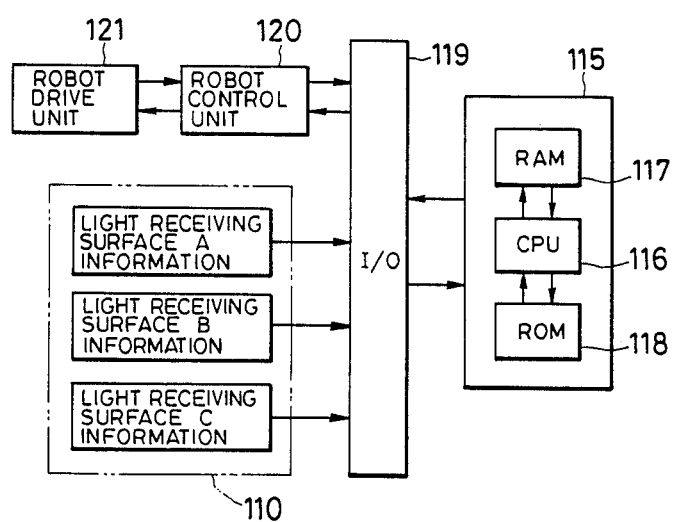
FIG. 10 is a block diagram showing an example of an industrial robot control circuit.

FIG. 10 is a block diagram showing a control circuit for the above robot. In FIG. 10, 115 is a microcomputer for driving the robot according to the instructions input by the MDI operation. which comprises a CPU 116, a RAM 117 and a ROM 118. The control signals are supplied to a robot control unit 120 via an I/O port 119. An output signal from the robot control unit 120 is applied to a robot drive unit 121 to drive the robot. Further, the light receiving information from the light receiving surfaces A, B and C of the measurement device 110 is supplied via the I/O port 119 to the microcomputer 115 and the software absolute X, Y and Z axes are accurately adjusted relative to the two installation reference surfaces 108 and 109.

To adjust the absolute X, Y and Z axes of the robot software in the industrial robot device thus constituted to the absolute X, Y and Z axes of the processing machine, first the robot's second arm 104 and the lower surface of the flange 107 are made horizontal by means of a spirit level, etc.

Next, the light projector 113 is mounted on the lower surface of the flange 107 in such a manner that three light beams 114 can be radiated onto the light receiving surfaces A, B and C perpendicularly. The robot tip end is then moved to a target position according to instruction input by the MDI operation with rotation about the γ axis effected so that the light 114 always irradiates the light receiving surface A, B and C perpendicularly.

When there is a difference between the movement instruction and the actual movement according to the instruction input by the MDI operation, which is detected by the measurement device 110, a movement program stored in the RAM 117 of the microcomputer 115 is revised according to the difference so that the absolute X, Y and Z axes are accurately adjusted with respect to both the reference surfaces 108 and 109.

Figure 11:
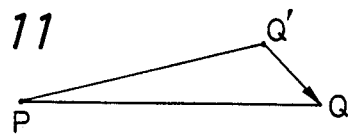
FIG. 11 is an explanatory diagram illustrating erroneous operations in the industrial robot device.

That is, if, for example, as illustrated in FIG. 11. the tip-end member 106 actually moves to a point Q' when the MDI instruction was effected to move the tip-end member 106 from a point P to point Q, the robot's software is corrected so as to make the point Q' coincide with the point Q.

This correction is not limited to correction only for the end point but it is also possible to correct the locus between the point P and Q by comparing a plurality of points on the actual path from the point P to the point Q' with the MDI instructions therefor.

Since the light receiving surfaces A, B and C are set in specific relations to the two robot installation reference surfaces 111 and 112, the surfaces A, B and C are also set in specific relations to the installation reference surfaces 108 and 109. Therefore, the correction for the MDI instruction on the basis of the observed values from the light receiving surfaces A, B and C makes possible correct adjustment of the software's absolute X, Y and Z axes with respect to the two robot installation reference surfaces 111 and 112. Consequently, by installing the robot base 102 on the installation reference surfaces of the processing machine correctly and accurately, the robot can be driven by instructions input by the MDI operation. As a result, online-teaching work with the robot installed on the processing machine is unnecessary, resulting in an improvement in working efficiency and in safety in the period prior to the start of robot work.

Although the light receiving surfaces A, B and C in three directions are arranged in parallel or vertical relation to the reference surfaces 108 and 109 in the above described embodiment, as long as the relation with respect to the installation reference surfaces are clearly established beforehand, they need not necessarily be parallel or vertical. Also, it is possible to arrange four or more light receiving surfaces in accordance with the principal directions of movement of the robot tip end.

Further, although the above described embodiment is of a vertical joint type robot, the invention may also be applied to a horizontal joint type robot or a cylindrical coordinate type robot.

What is claimed is:

1. A method for operating an industrial robot device, comprising the steps of:
    providing a robot having a base having at least two nonparallel robot installation reference surfaces formed thereon and movable arm means supported by said base;
    positioning said robot so that said robot installation reference surfaces abut corresponding installation reference surfaces of a processing machine;
    positioning optical detecting means in at least first and second planes on said processing machine separated from but having a predetermined spatial relationship with respect to said installation reference surfaces of said processing machine;
    positioning an end of said movable arm means at a first reference position designated by a software instruction in accordance with a set of software absolute coordinate axes in a vicinity of said optical detecting means;
    projecting at least two beams of light from said end of said movable arm means in a direction of said optical detecting means;
    detecting a position of said beams of light on said optical detecting means;
    determining an amount of deviation of said first reference position from a second reference position fixed with respect to said installation reference surfaces of said processing machine; and
    modifying said software absolute coordinate axes in accordance with said amount of deviation.

2. The method for operating an industrial robot of claim 1 wherein said step of providing said optical detecting means comprises providing a matrix array of optical detectors in each of three orthogonal planes fixed with respect to said installation reference surfaces of said processing machine.

3. The method for operating an industrial robot of claim 2, wherein said step of projecting said light beams comprises projecting three light beams, one substantially perpendicular to each of said three orthogonal planes.

4. The method for operating an industrial robot of claim 3, further comprising the step of removing said optical detecting means from said processing machine.

* * * * *